Oct. 29, 1940.  A. E. ROURKE  2,219,334
BEVERAGE DISPENSER
Filed Sept. 24, 1938  2 Sheets-Sheet 1

INVENTOR:
ALFRED E. ROURKE
BY
ATTORNEY

Oct. 29, 1940.  A. E. ROURKE  2,219,334
BEVERAGE DISPENSER
Filed Sept. 24, 1938  2 Sheets-Sheet 2

INVENTOR:
ALFRED E. ROURKE
BY Baldwin Yale
ATTORNEY

Patented Oct. 29, 1940

2,219,334

UNITED STATES PATENT OFFICE 2,219,334

BEVERAGE DISPENSER

Alfred E. Rourke, San Francisco, Calif., assignor to Echlin Manufacturing Company, San Francisco, Calif., a corporation of California Application September 24, 1938, Serial No. 231,548

5 Claims. (Cl. 225—1)

This invention relates to improvements in beverage dispensers and, more particularly, to pressure controlled dispensers for beer, carbonated beverages, and the like.

The dispensing of "draft" beer has many disadvantages due largely to the complicated apparatus through which it must pass between the container and the ultimate service. Under prevailing conditions, draft beer is conveyed from the keg through pipes, chilling coils, and other apparatus that is difficult to keep sanitary under dispensing conditions. Beer is sensitive to chemical reactions with the compositions of the conduits and especially with residual ferments that may lurk therein. It has been heretofore impractical to draw beer from dispensing units of relatively small capacity because of the deterioration of unpasteurized residual held in the kegs between intervals of service. Under certain conditions, there may be as much as fifty percent or more loss of draft beer in tapped kegs standing over night.

On the other hand, bottled beer can be pasteurized and sealed in sterile, dark bottles so that it will keep indefinitely. Because of the internal bursting pressure, it is not practical to confine beer in glass bottles of a capacity greater than one-half gallon, about two and one-quarter liters. The present invention simplifies the apparatus and eliminates practically all the conditions detrimental to the zest and flavor of fermented beverages withdrawn intermittently from small commercial glass containers.

Among the other objects of the invention is to provide means for serving "bottled beer" under the most favorable "draft beer" conditions.

Another object is to draw beer from containers of relatively small capacity under consumer conditions.

Another object is to preserve the quality and saleability of the residual beer in the containers over a considerable period of time.

Another object is to increase the possible profit in serving draft beer in small dispensaries, such as cafés and the like.

Another object is to facilitate the attachment of the dispenser to the bottles after they are opened.

Another object is to prevent injury to the mouth of the bottles.

A further object is to simplify the refrigeration of the containers.

Other objects and advantages will appear as the description progresses.

In this specification and the accompanying drawings, the invention is disclosed in a preferred form; but it is to be understood that it is not limited to this form, because it may be embodied in modifications within the purview of the claims following the description.

Figure 1:
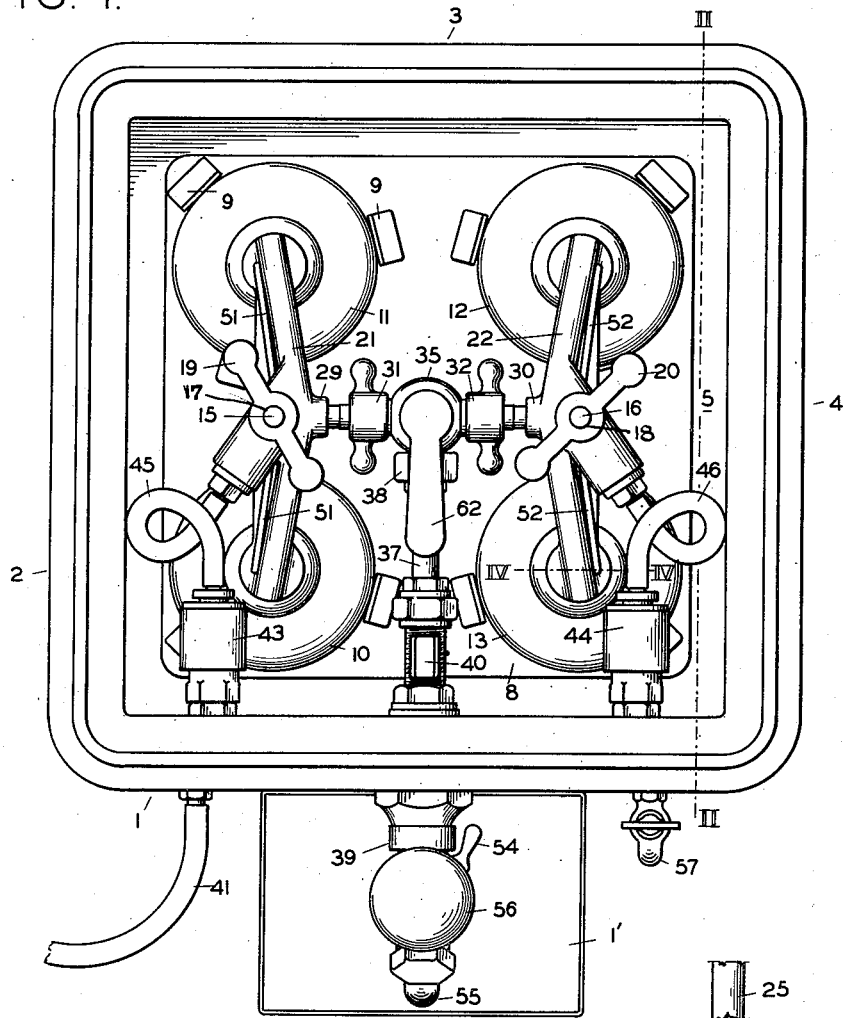
Fig. 1 is a plan view from above of a beverage dispenser with the cover removed, constructed in accordance with this invention.
Figure 5:
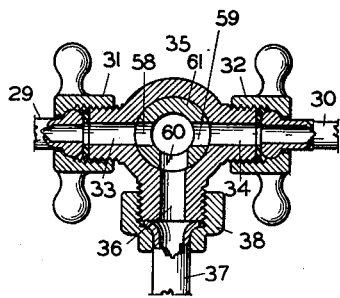
Fig. 5 is a detail in horizontal section of the beer distributer valve.
Figure 6:
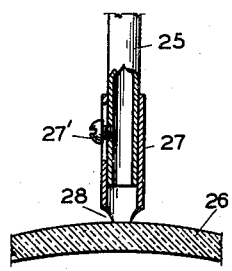
Fig. 6 is an enlarged detail, partly in vertical section, of the inlet end of the syphon tube.

In detail, the construction illustrated in the drawings, referring first to Fig. 1, comprises the thermo-insulated enclosing case having the front wall 1, the side walls 2, 3, 4, the bottom 5, and the removable cover 6, all of which are double walls packed with a suitable heat insulator 7 to form an ice box. The false bottom 8 is fixed to the inner bottom and is provided with the upstanding guides 9 to center the bottles 10, 11, and 12, 13 in their respective positions. The heads of the center bolts 15, 16 bear against the under side of the false bottom 8 and have threaded upper ends centered between the bottles 10, 11, and 12, 13 respectively. The free running wing nuts 19, 20 are threaded on the upper ends of their respective bolts to hold the bottles in operative position.

The clamp bars 21, 22 have center holes engaging their respective bolts 15, 16. Each end of these bars is provided with a countersunk socket to receive a soft gasket, such as 23 in Figs. 2 and 4. When the nuts 19 and 20 are screwed down on the threaded ends 17, 18 of the bolts 15, 16, the respective bottles are clamped to the false bottom 8 and their mouths pressure-sealed against the gaskets 23. These clamps also prevent the bottles floating upward in the chilling bath.

Figure 2:
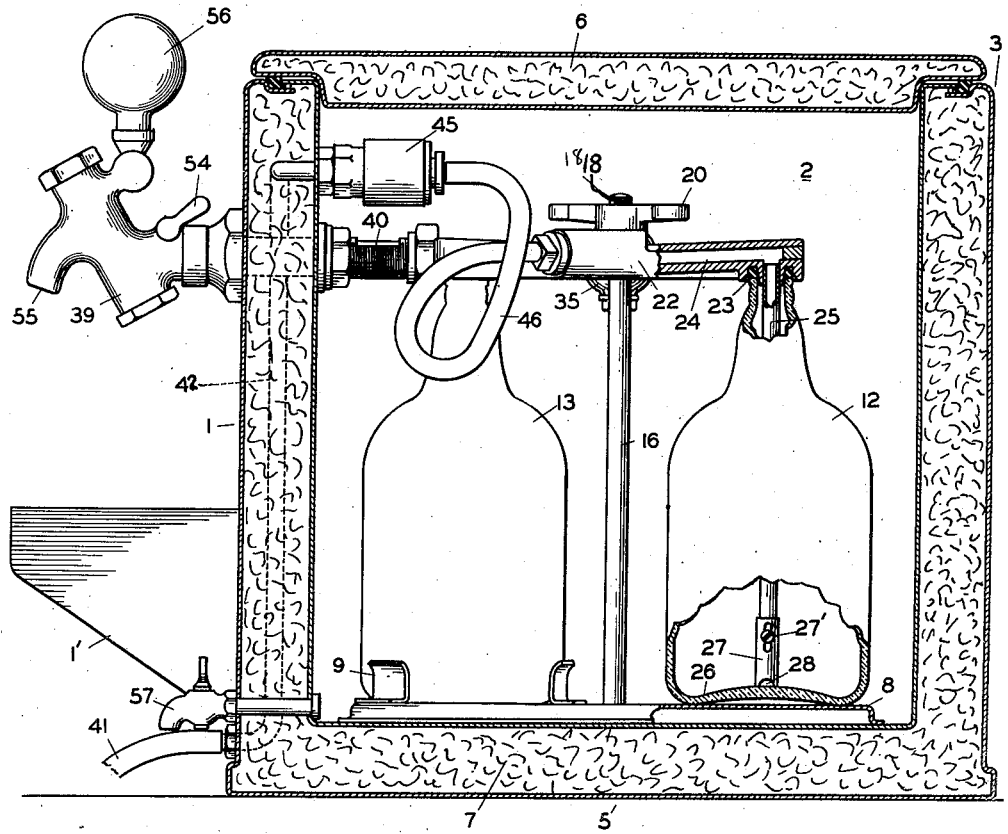
Fig. 2 is a side view in vertical section of the same, on the line II—II, Fig. 1.
Figure 3:
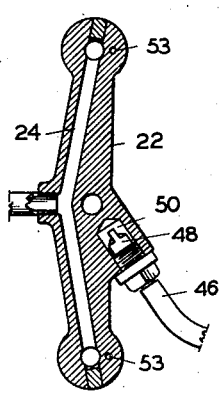
Fig. 3 is a horizontal section of the bottle clamp bar.

Each clamp bar 21, 22 has a longitudinal hole 24 therethrough, see Fig. 3. The syphon tubes, such as 25 in Fig. 2, are fixed in the opposite ends of the clamp bars 21, 22 and communicate with their respective holes 24, so that the bottles 10, 11 and 12, 13 are connected together through their respective clamp bars 21, 22. The ends of the several tubes 25 extend down into and end near the bottoms 26 so as to compensate for any difference in the depth of the various bottles. The sleeves 27 are slidably attached to the tubes 25 by the screws 27'. The notches 28 across the ends of the sleeves permit the flow of beer into the tubes 25. Any sediment in the bottles would lie below the raised center of the bottom 26 and not enter the tube 25. If it is desired to withdraw the whole content, the tubes 25 can be bent so that the sleeves 27 will reach below the center portion of the bottom 26.

The nipples 29, 30 extend from the sides of the clamp bars 21, 22 and communicate with the respective holes 24 therein. The compression couplings 31, 32 connect these nipples with the opposite ports 33, 34 of the distributer valve body 35. The outlet port 36 discharges into the pipe 37 having the coupling 38 engaging the valve body 35. This pipe 37 leads to the conventional beer tap or faucet 39 through the interposed sight glass 40, which discloses the condition of the flowing beer.

In addition to the normal dissolved gases inherent in the beer, capable of generating about ten to twelve pounds pressure per square inch in the full bottles, provision is made for additional pressure as the beer is withdrawn. The inlet tube 41 is connected to a source of pressure supply, preferably a tank of carbonic acid gas, delivering a regulated pressure of about fifteen pounds. This flows through the flexible tube 41 connected with the metal tube 42 concealed within the walls of the ice box and having branch outlets provided with the clutch couplings 43, 44 respectively to facilitate quick attachment and detachment of the flexible tubes 45, 46 to their respective clamp bars 21, 22. These tubes feed through check valves such as 48 within the chamber 50 in the clamp bars, see Fig. 3.

Figure 4:
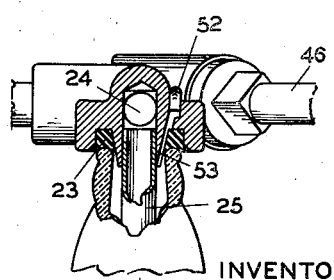
Fig. 4 is an enlarged fragmentary detail in vertical section of the sealing socket in each end of the clamp bar, taken on the line IV—IV, Fig. 1.

The external tubes 51, 51 and 52, 52 lead from the chamber 50 to by-passes such as 53 into their respective bottles 10, 11 and 12, 13; see Fig. 4. This arrangement of tubes delivers the pressure from the inlet 41 to all the bottles to maintain the desired pressure therein as the beer is withdrawn. Instead of the external tubes 51, 52, passages can be cored or drilled through the body of the clamp bar.

The conventional beer faucet 39 has the finger lever 54 controlling an internal tapered plug to spread the flowing beer in the form of an annular film discharged at 55 when the handle 56 is pulled down. There are several types of such faucets on the market adapted to control "wild" beer and also to regulate the proportion of foam or "collar" in the drinking glass, mug, stein, or the like resting on the shelf of the drip pan 1'.

The beverage in the bottles 10—13 is preferably chilled by immersion in a "sweet bath" formed by filling the box about half full with water then adding cracked ice to chill the bath, or by any other suitable method of refrigeration. The ice box can be emptied through the drain cock 57.

This invention operates substantially as follows: The present structure is designed particularly for bottled beer with the mouth of the bottle sealed by metal caps, such as "crown" caps, crimped thereon. The four bottles are set in position within the ice box and properly centered by the clips 9. The sealing caps are then removed and the clamp bars 21, 22 set in position and forced down against the mouths of the bottles by the nuts 19, 20. It is advisable to precool the bottles before use to prevent the beer from foaming when uncapped.

The gases evolved from the beer and the gas pressure introduced within the bottles cause the contents to flow upward through the syphon tubes 25 into the hollow clamp bars 21, 22, to the distributing valve 35, through the ports 58, 59 and the by-pass 60 to the dispensing faucet or tap 39 located above the drip pan 1' and detachably attached to the front wall 1. Should it be desired to draw from only one pair of bottles, the three-way plug valve 61 is turned by means of the handle 62 to bring either of the ports 58 or 59 into registry with the outlet port 36, thus sealing one of the inlets 33 or 34. This permits the replacement of either pair of bottles without interfering with service from the other two during slack periods of demand. As the liquid is withdrawn from the bottles, a compensating volume of gas from the gas service 41 is admitted to maintain the gas pressure within the bottles. In the service of beer or any carbonated beverage, it is advisable to introduce carbonic acid gas at 41 in pressures in excess of the normal pressure of evolved gases in the bottles; this excess pressure of, for instance, two to three pounds, prevents effervescence within the liquid until after it is served from the faucet 39. This prevents the beverage from going "flat" or stale while in storage within the apparatus.

It will be noted that the clamp bars 21, 22 and assembled mechanisms can be disconnected at 31, 32 and 43, 44 and the whole assembly immersed in a suitable sterilizing bath at intervals. The valve mechanism at 35 and the draft faucet 39 can be similarly disconnected for the same purpose. For further simplification, the clamp bars, distributing valve, and assembled parts could be made in the form of a single unit.

The tube 37 is preferably of block tin or the like, adapted to bend to accommodate the clamp mechanism to variations in the height of the bottles.

While the invention has been disclosed with particular reference to beer and similar carbonated and foaming beverages, it is equally adaptable to dispensing iced drinks of any nature that are subject to deterioration after the container is opened. It is also adaptable to containers of any size, shape, or material consistent with the objects of the invention.

Having thus described this invention, what I claim and desire to secure by Letters Patent is:

1. A beverage dispenser including a base; a plurality of containers on said base; a distributing valve; hollow clamp bars adapted to seal the outlets of said containers and having tubes extending thereinto and connected with said valve; clamping means between said base and clamp bars; a dispensing faucet connected with said distributing valve; and means for introducing gas pressure within said containers through said hollow clamp bars.

2. A beverage dispenser including an enclosing refrigerating box; a plurality of containers in said box; a distributing valve; means for sealing the outlets of said containers and having tubes extending thereinto and connected with said valve, whereby certain of said containers may intercommunicate through said valve selectively; a dispensing faucet connected with said valve; and means for maintaining a gas pressure within said containers.

3. A beverage dispenser including an enclosing refrigerating box; a plurality of containers in said box; a distributing valve; hollow clamp bars adapted to seal the outlets of said containers and having tubes extending thereinto; means for pressing said clamp bars against the outlets of said containers; detachable couplings between said clamp bars and said valve; a dispensing faucet; a sight feed between said valve and faucet; and means for maintaining a gas pressure within said containers through said sealing means.

4. A beverage dispenser including a plurality of containers; a dispensing faucet; a clamp bar having a liquid passage and a gas passage therethrough; tubes on said bar open to said liquid passage and extending into said containers and connected with said faucet; and a source of gas pressure connected with said containers through said gas passage.

5. A beverage dispenser including a plurality of containers arranged in pairs; clamp bars each having sealing means on their opposite ends engaging the outlets of a pair of containers respectively; a distributing valve; tubes on said clamp bars extending into said containers; couplings interposed in connections between said valve and clamp bars respectively; a dispensing faucet; a bendable connection between said valve and faucet; and a source of gas pressure connected with all of said containers through flexible connections with said clamp bars respectively.

ALFRED E. ROURKE.